UNITED STATES PATENT OFFICE.

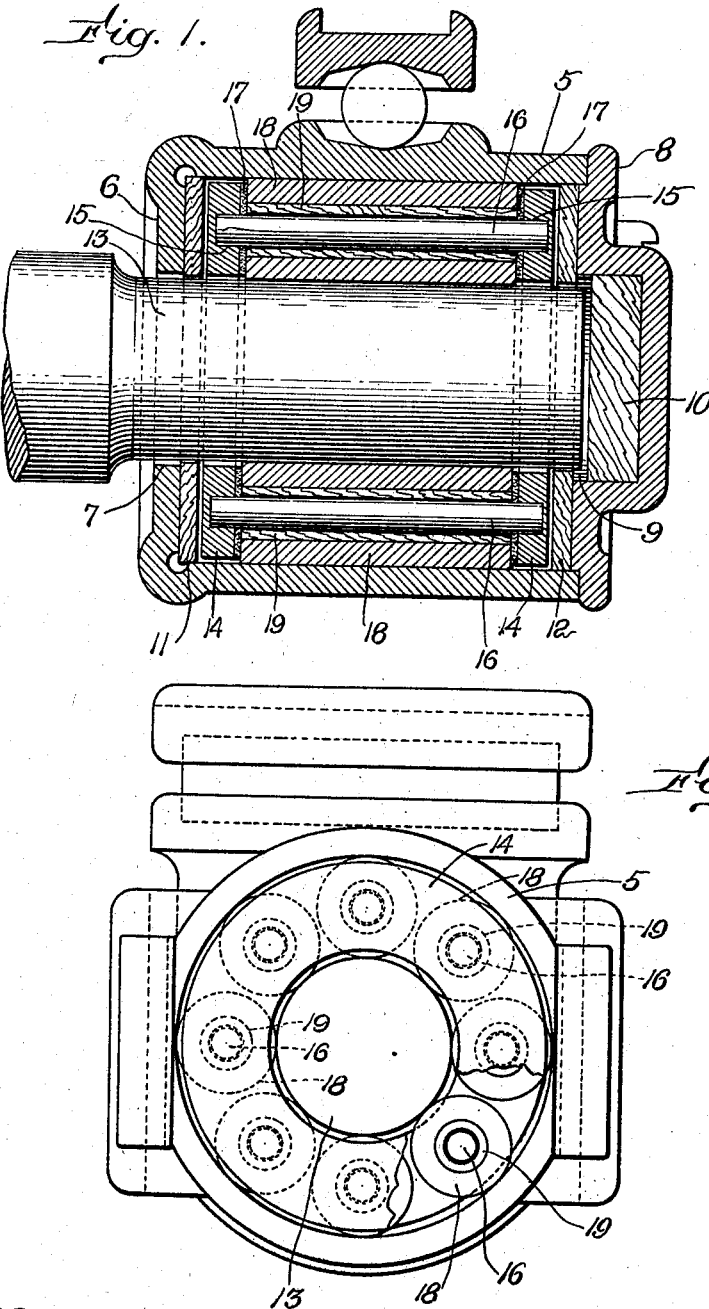

ELIEL L. SHARPNECK, OF WINTHROP, MASSACHUSETTS.

ROLLER-BEARING.

No. 923,716.  Specification of Letters Patent.  Patented June 1, 1909.

Application filed August 25, 1908. Serial No. 450,170.

*To all whom it may concern:*

Be it known that I, ELIEL L. SHARPNECK, of Winthrop, in the county of Suffolk and State of Massachusetts, have invented certain new and useful Improvements in Roller-Bearings; and I hereby declare that the following is a full, clear, and exact specification of the same, reference being had to the accompanying drawing, forming part thereof.

This invention has reference to improvements in roller bearings and refers particularly to the peculiar means whereby frictional resistance between moving parts of the bearing is reduced.

One object of the invention is to improve the construction of the anti-friction rolls and the mountings therefor.

Another object of the invention is to reduce the frictional resistance between the ends of the rotating members and the stationary parts of the journal box.

Other objects of the invention will appear from the following description.

The invention consists in such peculiar features of construction and combination of parts as shall hereinafter be described and pointed out in the claims.

Figure 1, represents a sectional view of the improved roller bearing shown as applied to a journal box and in relation to a shaft journaled therein. Fig. 2, represents an end view of the same with the journal box cover removed, parts of the bearing being broken away.

Similar numbers of reference designate corresponding parts throughout.

As shown in the drawings in its preferred form 5 represents a journal box having a cylindrical inner wall and furnished with the end 6 having the cylindrical opening 7. The open end of said box is closed by the cover 8 having the pocket 9 furnished with the wooden block 10 seated in said pocket and preferably of a thickness less than the depth of said pocket. Within the cylindrical way formed by the box 5 and at the ends thereof are secured the annular wooden anti friction collars 11 and 12. These collars, 11 and 12, as well as the block 10 are saturated with lubricant of any well known nature, preferably oil, and said collars have central openings to receive the shaft 13 one end of which is received in the pocket 9 being free, in its slight endwise movement, to bear against the block 10 which forms an anti friction thrust bearing therefor.

Mounted in the box 5 is a cage formed with a pair of annular metallic members 14—14 each having a series of sockets 15—15 at their inner sides to closely fit the ends of the metallic pins 16—16 which are driven through perforations in the anti friction washers 17—17 and into said sockets 15—15.
On said pins 16—16 are journaled anti friction rolls which comprise outer tubular metallic members 18—18 having driven therein the wooden bushings 19—19 which are treated with any well known lubricant and have axial bores free to rotate on the pins 16—16. In this structure the rolls 18—18 are free to rotate independently between the cylindrical way, formed by the wall of box 5, and the periphery of the shaft 13 while said rolls are held in alinement by the pins 16—16 on which the bushings 19—19 are free to rotate with comparatively little friction. The anti friction roller cage as a whole is free to revolve about the shaft 13 and any end thrust of the smooth outer surfaces of members 14—14 of said cage is received by the anti friction collars 12—12.

It is to be noted that by the driving of the bushing 19 into the bore of the roll 18 these parts are firmly secured together against independent movement and the fibers of the bushing or sleeve 19 are somewhat compressed.

Having thus described my invention I claim as new and desire to secure by Letters Patent.

The combination with a cylindrical casing having a cover furnished with an axially disposed pocket, a wooden block in said pocket, a pair of wooden anti friction collars frictionally secured in said casing, and a cage rotatably mounted between said collars and comprising a pair of annular members having sockets at their inner sides, rolls carried by said pins consisting of wooden bushings rotatably mounted on said pins and outer metallic sleeves into which said bushings are driven, and anti friction washers located between said rolls and said annular members and mounted on said pins, substantially as and for the purpose described.

ELIEL L. SHARPNECK.

Witnesses:
ISABEL TABERNER,
H. J. MILLER.